March 20, 1928.  
J. C. HANNA  
SUSPENSION MECHANISM  
Filed July 10, 1924  
1,662,856  
2 Sheets-Sheet 1

Inventor  
John C. Hanna  
By Wallace R. Lane Attys.

March 20, 1928. 1,662,856
J. C. HANNA
SUSPENSION MECHANISM
Filed July 10, 1924 2 Sheets-Sheet 2

Inventor:
John C. Hanna
By Wallace R. Lane Attys

Patented Mar. 20, 1928.

1,662,856

UNITED STATES PATENT OFFICE.

JOHN C. HANNA, OF EVANSTON, ILLINOIS, ASSIGNOR TO HANNA ENGINEERING WORKS, OF CHICAGO, ILLINOIS, A CORPORATION OF ILLINOIS.

SUSPENSION MECHANISM.

Application filed July 10, 1924. Serial No. 725,108.

This invention relates to suspension mechanism, and has for its object to provide a mechanism to adjustably suspend a functioning machine, as for example a riveter, punch or the like, means being provided to permit ready variation of location of the functioning point of a machine.

This and other objects will be more fully set forth and described in the following specification and shown in the accompanying drawings, in which—

Like numerals refer to like elements throughout the drawings, in which 10 designates generally a riveter frame having a gap $10^a$ between the jaws $10^b$ and $10^c$. The usual anvil die 11 is shown as mounted in jaw $10^c$, while a co-acting riveting die, not shown, is reciprocably mounted in the jaw $10^b$, in well known manner.

Figures 1, 2:
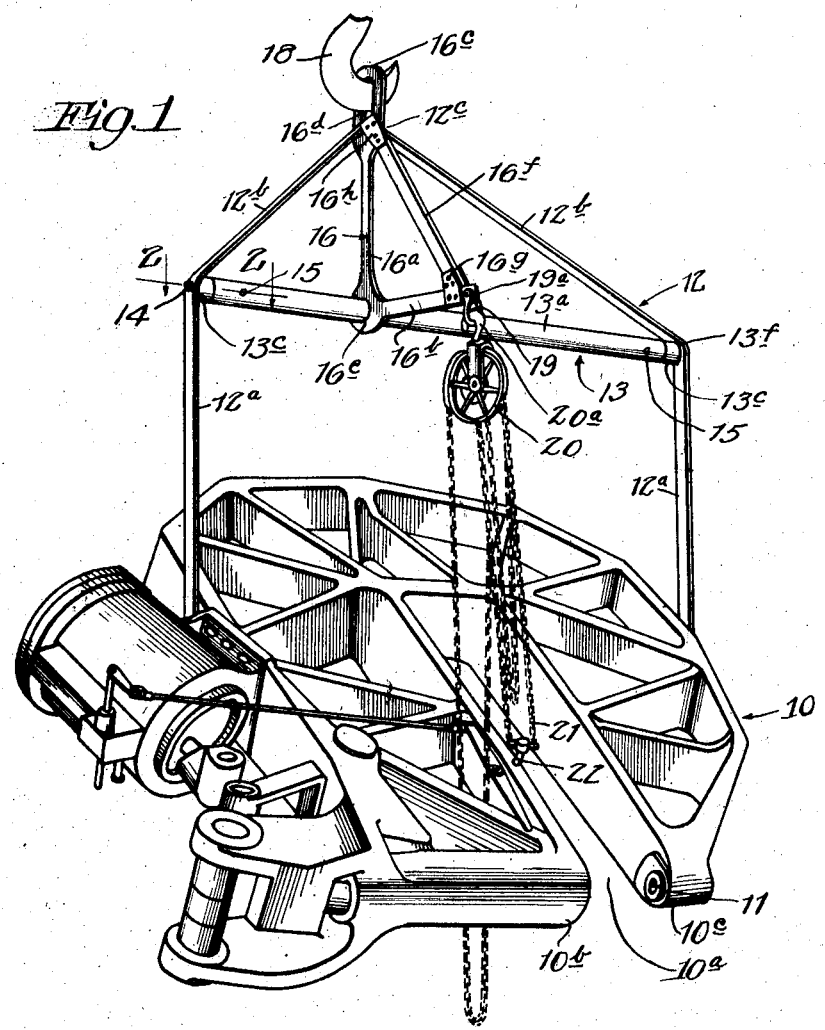
Fig. 1 is a perspective of a riveter suspended by my mechanism.
Fig. 2 is a vertical section through a portion of the suspension bail and spreader drawn to an enlarged scale, taken along line 2—2 of Fig. 1.

The suspension mechanism proper consists of a bail member generally indicated by the numeral 12, having the spaced parallel arms $12^a$ and the connecting top inclined portions $12^b$, which join at an apex $12^c$. A spreader generally indicated by numeral 13 extends between the side arms $12^a$ at the point of juncture with the upper portions $12^b$. This spreader is constructed of a tube $13^a$ having its bore slightly enlarged at each end to form the shoulders $13^b$. An end piece $13^c$ is provided with the reduced shank $13^d$ fitting into the end of the tube $13^a$ and abutting against the shoulder $13^b$, one of these end pieces being provided at each end. The head $13^e$ of each end piece $13^d$ is slightly chamfered or curved at $13^f$ to accommodate the bend at the juncture of the upper portion $12^b$ of the inside arms $12^a$. A bolt 14 extends through suitable aperture in the side arm $12^a$ and is threaded into a tapped hole in the end piece $13^e$, as shown in Fig. 2. A fastening pin 15 is driven through the shank $13^d$ and the tube $13^a$ to secure each end piece in assembled relation.

Figure 3:
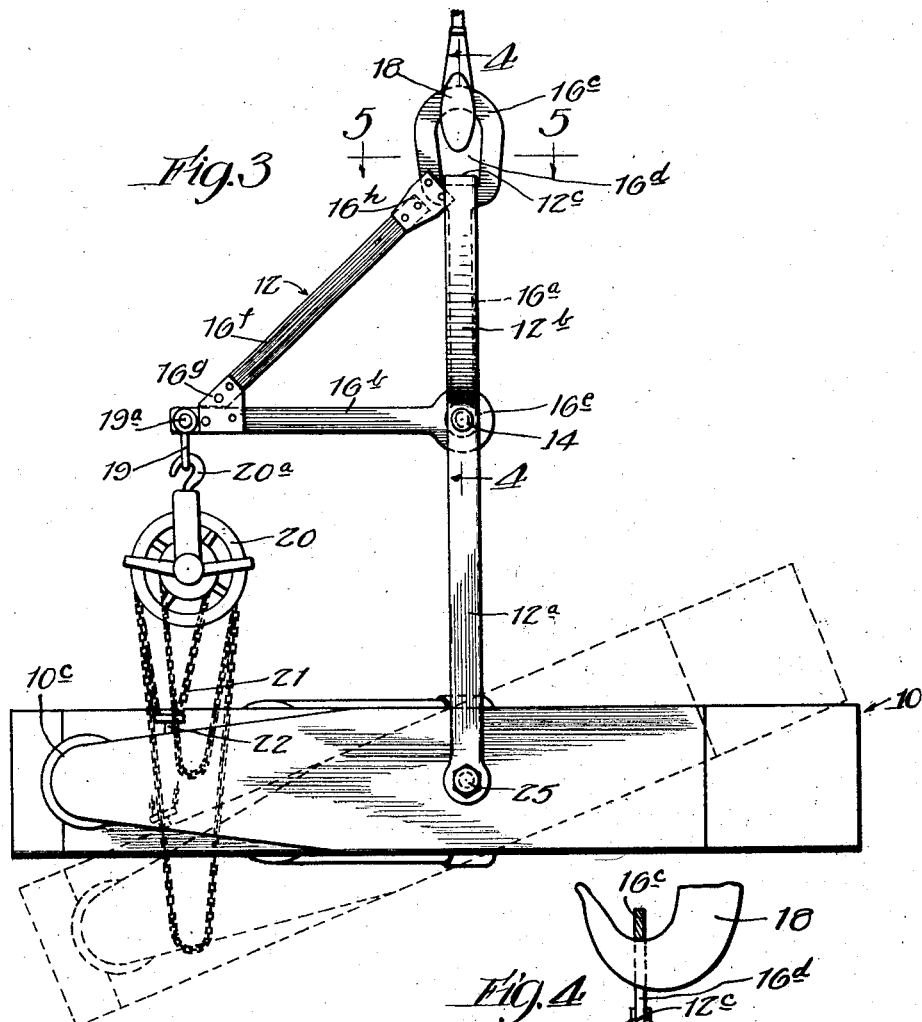
Fig. 3 is a side elevation of the riveter and mechanism.
Figure 4:
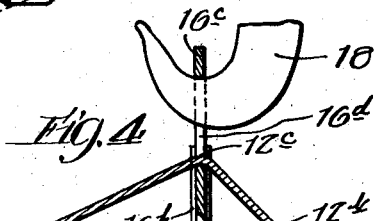
Fig. 4 is a vertical section along the line 4—4 of Fig. 3, drawn to an enlarged scale.
Figure 5:
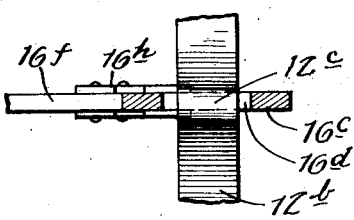
Fig. 5 is a similar view along the line 5—5 of Fig. 3.

A supporting member, generally indicated by 16, is provided and consists of a bell crank having the vertically arranged arm $16^a$ and a horizontally arranged arm $16^b$, the former being provided with the head $16^c$, which is provided with the elongated aperture $16^d$. The bell crank is apertured at the apex at $16^e$, and fits over the spreader 13, as shown in Fig. 1. Extending between the arm $16^a$ and $16^b$ is the tie bar $16^f$ secured to said arm by suitable plates $16^g$ and $16^h$, which are riveted or otherwise secured to the bell crank arms and the tie-bar $16^f$. The hook 18 of a lifting crane or the like is inserted through the elongated aperture $16^d$ for general support and movement of the suspension mechanism and its load. The end of arm $16^b$ projects outwardly of the plates $16^g$ and is apertured to permit the pivotal attachment of a clevis 19 by means of the pin $19^a$ or the like, see Figs. 1 and 3 for example. In this clevis 19 is inserted the swivel hook $20^a$ of a chain hoist 20 or the like, the lifting chain 21 of which is attached to the bolt 22, which is in turn secured to the riveter frame in such wise as not to interfere with the reach of the riveter or other mechanism. The apex $12^c$ of the bail 12 is mounted in the aperture $16^d$, as shown in Fig. 3 for example. The lower ends of the bail side arms $12^a$ are apertured to accommodate pivot bolts or pins 25, which are secured to the sides of the riveter frame 10, the axis of this pivotal mounting of the frame being on the opposite side of the center of gravity of the riveter from the functioning point, by which I mean the point of function of the operating tools. In the embodiment shown, this would be the point of riveting. The axis of pivotal movement of the frame is just sufficiently off center to insure a pull upon the supporting chains 21.

It should be noted that the point of support of the bail from the hook 18 and the center of gravity of the machine 10, lie in a vertical plane perpendicular to the axis of the pivotal movement, so that the arc of travel of the functioning point lies in a vertical plane, which is desirable for proper functioning.

The suspension mechanism described above is so constructed as to permit pivotal adjustment of the riveter frame to any one of a number of operating positions from a substantially vertical plane to a horizontal plane, or above. The riveter having been properly located with respect to the work upon which it is to operate, it is possible to vary the position of the functioning point by actuation of the chain hoist 20 to perform a number of riveting operations without a variation in the general position of the mechanism, which will require moving of the main supporting hook 18. As a result, the operator is enabled to readily position his riveter for a number of operations without movement of the main supporting frame, or the like, by which it is relatively difficult to properly position the riveter.

It will be obvious that my invention is susceptible of modification, and I do not wish to be restricted to the form shown and described, except as defined in the appended claims.

What I claim is:

1. A suspension mechanism for supporting a functioning device, comprising a bail member with spaced supporting sides and a transverse spreader extending between said sides, a supporting member extending outwardly from said spreader and said bail, and variable means connected to said supporting member and to the functioning device for raising or lowering the functioning point of the functioning device.

2. A suspension mechanism comprising a bail member with spaced side arms and a transverse upper portion, means operatively attached to said upper portion to support said bail, a spreader member extending transversely between said side arms, an outwardly extending supporting member from said spreader, and an outwardly and downwardly extending member from said upper portion of said bail, and lifting means carried by said supporting member.

3. A suspension mechanism comprising a bail having spaced side arms and a transverse upper portion, a spreader extending between said side arms and supporting member having a portion extending between the upper portion of said bail and said spreader, a second portion projecting outwardly from said spreader, and a third portion connecting said first and second portions.

4. A suspension mechanism comprising a bail having spaced side arms and a transverse upper portion, a spreader extending between said side arms and supporting member having a portion extending between the upper portion of said bail and said spreader, a second portion projecting outwardly from said spreader, and a third portion connecting said first and second portions, and lifting means depending from and carried by said supporting member.

5. A suspension mechanism comprising a bail having spaced supporting side arms and a transverse upper portion, a spreader member extending between said side arms and comprising a tube with end members inserted in the ends thereof for contact with the sides of said bail.

6. A suspension mechanism comprising a bail having spaced supporting side arms and a transverse upper portion, a spreader member extending between said side arms and comprising a tube with end members inserted in the ends thereof for contact with the sides of said bail, bolts extending through said bail side arms and into said end members.

7. In combination, a machine having a functioning point, a suspension mechanism therefor, comprising a bail having spaced side arms pivotally attached to said machine on the opposite side of its center of gravity from said functioning point, and supporting means associated with said bail, and a lifting means carried by said supporting members and operatively attached to said machine.

8. In combination, a machine having a functioning point, a suspension mechanism therefor, comprising a bail having spaced side arms pivotally attached to said machine, a spreader extending between said side arms, said bail being provided with a transverse upper portion, a supporting member having portions extending from said upper portion of said bail and from said spreader outwardly of said bail, a lifting means carried by said supporting member and operatively attached to said machine.

9. In combination, a machine having a functioning point, a suspension mechanism, comprising a bail having spaced side arms pivotally attached to said machine, and a transverse connecting upper portion suitably supported, a spreader extending between said side arms of said bail and attached thereto, the supporting member having a portion extending outwardly from the point of support of said bail and a second portion extending outwardly from said spreader, and a lifting member carried by said supporting member and operatively attached to said machine.

10. The combination with a machine of the riveter type of a main horizontal pivotal support for said machine on an axis near but offset substantially horizontally from the center of gravity of said machine; a supplemental support engaging said machine remote from said main support and remote from and on the opposite side of the center of gravity with respect to said main support; and means connecting said main and supplemental supports and including force transmitting mechanism, for tilting said machine about said main support preparatory to but independent of the operation of the machine itself, and for automatically holding said machine in adjusted position.

In witness whereof, I hereunto subscribe my name to this specification.

JOHN C. HANNA.